(12) United States Patent
Jia et al.

(10) Patent No.: US 8,699,589 B2
(45) Date of Patent: Apr. 15, 2014

(54) SYSTEM AND METHOD FOR MULTI-CELL JOINT CODEBOOK FEEDBACK IN WIRELESS COMMUNICATIONS SYSTEMS

(75) Inventors: Ming Jia, Ottawa (CA); Mohammadhadi Baligh, Kanata (CA); Jianglei Ma, Ottawa (CA); Peiying Zhu, Kanata (CA); Wen Tong, Ottawa (CA)

(73) Assignee: FutureWei Technologies, Inc., Plano, TX (US)

( * ) Notice: Subject to any disclaimer, the term of this patent is extended or adjusted under 35 U.S.C. 154(b) by 335 days.

(21) Appl. No.: 12/830,405

(22) Filed: Jul. 5, 2010

(65) Prior Publication Data

US 2011/0002406 A1 Jan. 6, 2011

Related U.S. Application Data

(60) Provisional application No. 61/223,306, filed on Jul. 6, 2009, provisional application No. 61/252,846, filed on Oct. 19, 2009.

(51) Int. Cl.
*H04K 1/10* (2006.01)

(52) U.S. Cl.
USPC ........... 375/260; 375/267; 375/299; 375/347; 375/349

(58) Field of Classification Search
USPC ........................... 375/260, 267, 299, 347, 349
See application file for complete search history.

(56) References Cited

U.S. PATENT DOCUMENTS

2008/0080449 A1* 4/2008 Huang et al. .................. 370/342

OTHER PUBLICATIONS

Catt, "Analysis of CQI/PMI Feedback for Downlink CoMP," R1-090941, 3GPP TSG RAN WG1 meeting #56, Feb. 9-13, 2009, 4 pages, Athens, Greece.
Nortel, "Discussion and Link Level Simulation Results on LTE-A Downlink Multi-site MIMO Cooperation," R1-084465, 3GPP TSG-RAN Working Group 1 Meeting #55, Nov. 10-14, 2008, pp. 1-11, Prague, Czech Republic.
Qualcomm Europe, "TP for feedback in support of DL CoMP for LTE-A TR," R1-092290, 3GPP TSG-RAN WG1 #57, May 4-8, 2009, 4 pages, San Francisco, CA.

* cited by examiner

*Primary Examiner* — Kabir A Timory
(74) *Attorney, Agent, or Firm* — Slater & Matsil, L.L.P.

(57) ABSTRACT

A system and method for multi-cell joint codebook feedback in wireless communications systems are provided. A method for operations at a communications device receiving joint transmissions from a plurality of communications controllers includes estimating a channel between the communications device and each communications controller in the plurality of communications controllers, thereby producing a plurality of channel estimates, computing feedback information based on the plurality of channel estimates, transmitting the feedback information, and receiving simultaneous transmissions from the plurality of communications controllers. The computing is based on a phase adjustment for the plurality of channels or a joint optimization of the plurality of channels, and the simultaneous transmissions are precoded based on the feedback information.

7 Claims, 6 Drawing Sheets

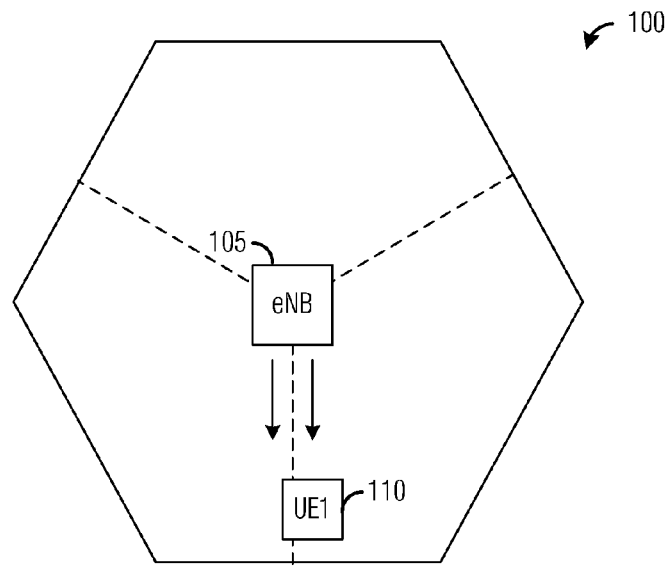
*Fig. 1a*
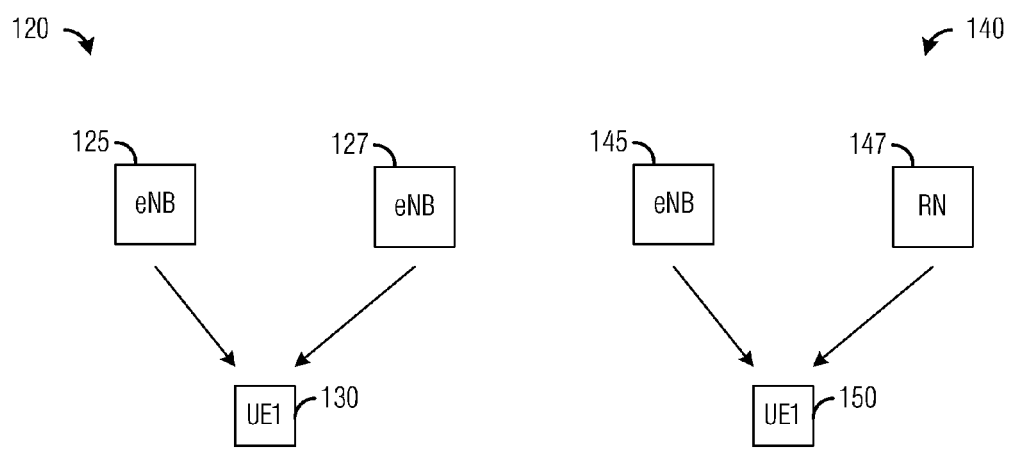
*Fig. 1b*  *Fig. 1c*

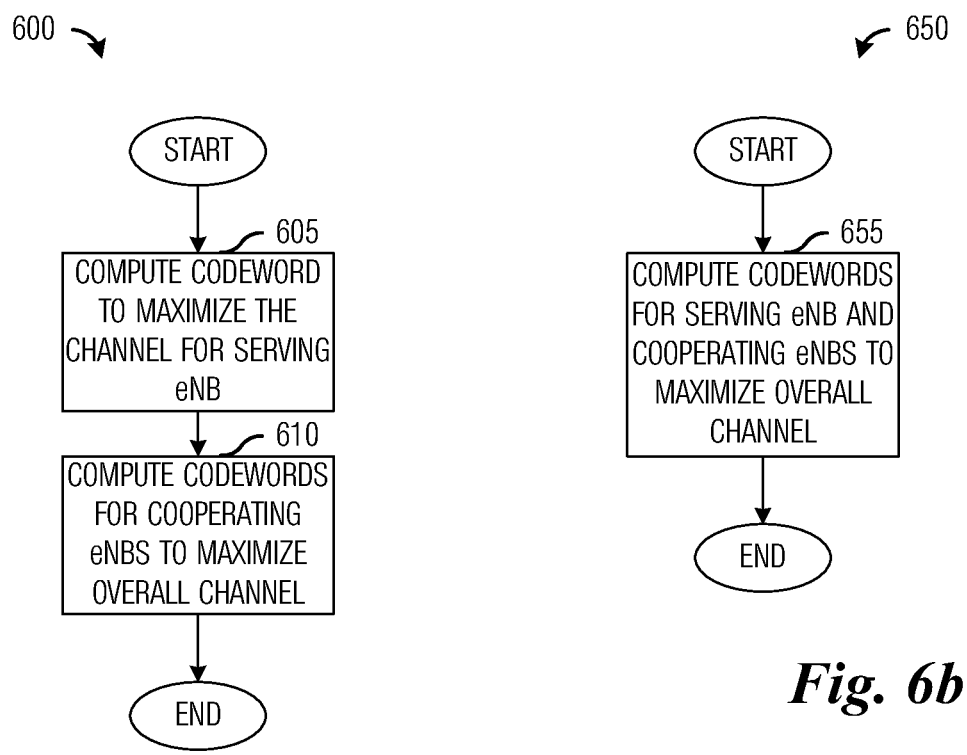

SYSTEM AND METHOD FOR MULTI-CELL JOINT CODEBOOK FEEDBACK IN WIRELESS COMMUNICATIONS SYSTEMS

This application claims the benefit of U.S. Provisional Application No. 61/223,306, filed on Jul. 6, 2009, entitled "System and Method for Joint Codebook Feedback in Wireless Communications Systems with Coordinated Multi-Point Transmission," and U.S. Provisional Application No. 61/252,846, filed on Oct. 19, 2009, entitled "Simplified Joint Codebook Feedback in Downlink CoMP," which applications are hereby incorporated herein by reference.

TECHNICAL FIELD

The present invention relates generally to a system and method for wireless communications, and more particularly to a system and method for multi-cell joint codebook feedback in wireless communications systems.

BACKGROUND

Generally, in joint transmission, such as coordinated multi-point (CoMP) transmission, transmissions from multiple enhanced NodeBs (eNBs), also commonly referred to as base stations, controllers, base terminal stations, and so on, are made simultaneously to a single User Equipment (UE), also commonly referred to as mobile stations, subscribers, terminals, users, and so forth. In CoMP transmission, the coordination of transmissions made by the eNBs enable the UE to combine the transmissions to improve high data rate coverage and to increase system throughput in advanced wireless communications systems, such as the Third Generation Partnership Project (3GPP) Long Term Evolution-Advanced (LTE-A).

In order to further help achieve better channel utilization and increase overall system performance, channel state/statistics/information about a downlink (DL) channel(s) between an eNB and a UE may be provided by the UE to the eNB. The channel state/statistics/information provided by the UE enables the eNB to adjust its transmitter to more effectively make use of the DL channel(s) condition.

In general, there may be two types of channel state/statistics/information feedback schemes available for use in 3GPP LTE-A compliant communications systems: explicit channel state/statistics/information feedback and implicit channel state/statistics/information feedback. With explicit channel state/statistics/information feedback, an eNB determines a CoMP transmission processing matrix based in whole or major part on the CoMP channel state/statistics/information, and therefore better CoMP performance can be obtained at the expense of high feedback overhead. With implicit channel state/statistics/information feedback, an eNB determines the CoMP transmission processing matrix based on channel state/statistics/information, such as precoding matrix indicator (PMI)/rank indication (RI), recommended by UE. For non-coherent multi-point CoMP transmission, only disjoint PMI/RI information (or individual PMI for cells in CoMP cooperation set) is required, while for coherent multi-point CoMP transmission, joint PMI/RI feedback which contains additional inter-cell spatial information is required. Usually joint PMI/RI feedback demands more feedback overhead than disjoint PMI/RI feedback.

SUMMARY OF THE INVENTION

These and other problems are generally solved or circumvented, and technical advantages are generally achieved, by preferred embodiments of the present invention which provides a system and method for multi-cell joint codebook feedback in wireless communications systems.

In accordance with a preferred embodiment of the present invention, a method for operations at a communications device receiving a joint transmission from a plurality of communications controllers is provided. The method includes estimating a channel between the communications device and each communications controller in the plurality of communications controllers, thereby producing a plurality of channel estimates, computing feedback information based on the plurality of channel estimates, transmitting the feedback information, and receiving simultaneous transmissions from the plurality of communications controllers. The computing being based on a phase adjustment for the plurality of channels or a joint optimization of the plurality of channels, and the simultaneous transmissions are precoded based on the feedback information.

In accordance with another preferred embodiment of the present invention, a method for operations at a communications controller participating in a joint transmission to a communications device is provided. The method includes transmitting a pilot signal, receiving feedback information from the communications device, selecting the communications device for a transmission, computing a precoder for the transmission to the communications device, precoding the transmission with the precoder, and transmitting the precoded transmission to the communications device. The feedback information being based on a phase adjustment for a plurality of channels or a joint optimization of the plurality of channels, and the computing is based on the feedback information.

In accordance with another preferred embodiment of the present invention, a communications device is provided. The communications device includes a receiver to be coupled to a receive antenna, a transmitter to be coupled to a transmit antenna, a measurement unit coupled to the receiver, and a controller coupled to the receiver, to the transmitter, and to the measurement unit. The receiver receives signals detected by the receive antenna, the transmitter transmits signals with the transmit antenna, and the measurement unit measures a channel between the communications device and a communications controller. The controller computes feedback information related to channels between the communications device and at least two communications controllers participating in a joint transmission to the communications device. The controller computes the feedback information based on a phase adjustment for a plurality of channels between the communications device and the at least two communications controllers or a joint optimization of the plurality of channels.

An advantage of an embodiment is that the amount of feedback is reduced. The amount of feedback is equal to that of the disjoint report (local codebook based PMI with no inter-points coordination). Therefore, the feedback overhead is kept to a minimum, thereby minimizing the impact of the feedback overhead on the overall communications system performance.

A further advantage of an embodiment is that codebook coordination among the CoMP points has already been inexplicitly taken into account in the feedback process.

An additional advantage of an embodiment is that no addition phase adjustment feedback is needed. Therefore, the feedback overhead is independent of the transmission rank and no CoMP size dependent additional inter-cell information is needed. Therefore, processing of feedback information is reduced, thereby reducing the processing requirements of the eNB.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 1a is a diagram of joint transmission with a single eNB of a communications system;

FIG. 1b is a diagram of joint transmission with multiple eNBs of a communications system;

FIG. 1c is a diagram of joint transmission with a single eNB and a relay node (RN) of a communications system;

FIG. 2b is a diagram of a detailed view of a control unit shown in FIG. 2a;

FIG. 6a is a flow diagram of first operations for use in computing feedback information for use in joint transmission;

FIG. 6b is a flow diagram of second operations for use in computing feedback information for use in joint transmission.

DETAILED DESCRIPTION OF ILLUSTRATIVE EMBODIMENTS

Figure 2A:
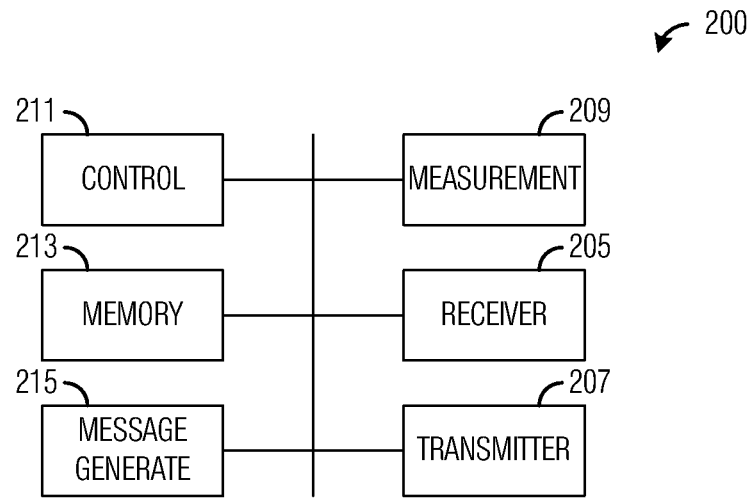
FIG. 2a is a diagram of a UE.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a 3GPP LTE-A compliant communications system supporting joint transmission. The invention may also be applied, however, to other communications systems supporting joint transmission, such as WiMAX, and so forth, compliant communications systems.

As discussed previously, joint transmission may involve multiple simultaneous transmissions from multiple sources to a single UE. There may be several different ways to achieve joint transmission. FIG. 1a illustrates joint transmission with a single eNB of a communications system 100. Communications system 100 includes an eNB 105 that is serving a UE 110. UE 110 happens to be operating near a border between two sectors of eNB 105. Since UE 110 is near the border between two sectors of eNB 105, it may be possible for UE 110 to detect transmissions from both sectors. Therefore, it may be possible to achieve joint transmission from separate sectors of a single eNB.

FIG. 1b illustrates joint transmission with multiple eNBs of a communications system 120. Communications system 120 includes a first eNB 125 and a second eNB 127. Communications system 120 also includes a UE 130. UE 130 happens to be operating within communications system 120 where it may be possible for UE 130 to detect transmissions from both first eNB 125 and second eNB 127. Therefore, it may be possible to achieve joint transmission from multiple separate eNBs.

FIG. 1c illustrates joint transmission with a single eNB and a relay node (RN) of a communications system 140. Communications system 140 includes an eNB 145 and a RN 147. In general, a RN may be a network component that functions like an eNB. Typically, the RN is not a fully functional eNB in that it does not have a backhaul link to core network. Furthermore, the RN does not have any network resources of its own, instead the RN utilizes network resources donated by a serving eNB, such as eNB 145, to allocate network resources to UEs served by the RN. RNs may be helpful in providing coverage in areas with spotty or weak eNB coverage.

UE 150 may be operating with communications system 140 where it may be possible for UE 150 to detect transmissions from both eNB 145 and RN 147. Therefore, it may be possible to achieve joint transmission from an eNB and a RN.

Although the discussion focuses on joint transmission from two sources, e.g., two sectors of a single eNB, two eNBs, an eNB and a RN, the embodiments described herein are operable with any number of sources, such as two, three, four, and so on, sources. Therefore, the discussion of joint transmission with two sources should not be construed as being limiting to either the scope or the spirit of the embodiments.

FIG. 2a illustrates a UE 200. UE 200 may be a communications device used to provide connectivity (voice, multimedia, data, and so forth) to a user. UE 200 may be capable of receiving multiple simultaneous transmissions from two or more eNBs and/or RNs, i.e., participate in joint transmission, and provide joint processing to improve a quality of its connection. However, in order to maximize the joint transmission performance, UE 200 may need to be able to provide information related to channels between itself and each of the eNBs and/or RNs transmitting to it.

UE 200 includes a receiver 205 and a transmitter 207. Receiver 205 may be coupled to one or more receive antennas and may be used to receive incoming signals. Transmitter 207 may be coupled to one or more transmit antennas and may be used to transmit outgoing signals. UE 200 may also include receive circuitry and transmit circuitry that may be used to perform processing on the received incoming signals and the outgoing signals prior to transmission. Processing by the receive circuitry may include filtering, amplifying, error detecting and correcting, de-interleaving, demodulating, and so on. Processing by the transmit circuitry may include filtering, amplifying, error encoding, interleaving, modulating, and so forth.

UE 200 may also include a measurement unit 209 coupled to receiver 205. Measurement unit 209 may be used to measure a channel between UE 200 and an eNB (or RN). Measurement unit 209 may utilize a pilot transmitted by the eNB to measure the channel. According to an embodiment, the eNB may transmit a UE specific pilot or a general pilot to assist UE 200 in measuring the channel. According to an alternative embodiment, measurement unit 209 may utilize a reference signal transmitted by the eNB in lieu of a pilot.

A control unit 211 may be used to control the operation of UE 200. In addition to controlling operations such as connection establishment and termination, user-interface operations, and so on, control unit 211 may be used to compute feedback information to be provided to the eNBs and/or RNs to assist in maximizing joint transmission performance.

According to an embodiment, control unit 211 may be able to compute a variety of feedback information based on the measurements of the channels to the eNBs and/or RNs provided by measurement unit 209. According to an embodiment, control unit 211 may compute the feedback information by combining the individual channels, computing a phase adjustment for the combined channel, and the computing channel information for the combined channel (or based on the channels to the eNBs and/or RNs from UE 200). Alternatively, control unit 211 may compute the feedback information by jointly optimizing the channels based on a criterion.

Although control unit 211 may be capable of computing the feedback information in a number of different ways, such as those described above, and thereby producing a variety of different feedback information that may need to be processed differently by the eNBs to ensure that the feedback information is used properly, once UE 200 enters a communications system, UE 200 knows which way it is supposed to compute the feedback information. For example, the communications system may be adherent to a technical standard that specifies how the feedback information is to be computed. Alternatively, during initial system entry, UE 200 may be told which way it is to compute the feedback information. Generally, UEs and eNBs are synchronized through messaging regarding the nature/type of the feedback information.

Control unit 211 may also be capable of quantizing the feedback information to help reduce the feedback overhead. Quantization of the feedback information may be performed using codebooks that may be stored in a memory 213.

In general, codebook quantization involves the selection of a codeword in the codebook that optimizes a codeword selection function and then sending an index to the codeword in place of the actual codeword to reduce the amount of information being sent. Codebook quantization requires that the codebook used in the quantization be present or generable at both ends of the feedback process.

UE 200 may also include a message generate unit 215. Message generate unit 215 may be used to generate a feedback message containing the feedback information. The feedback message may be transmitted to the eNBs participating in joint transmission or a serving eNB responsible for coordinating the joint transmission with cooperating eNBs.

Figure 2B:
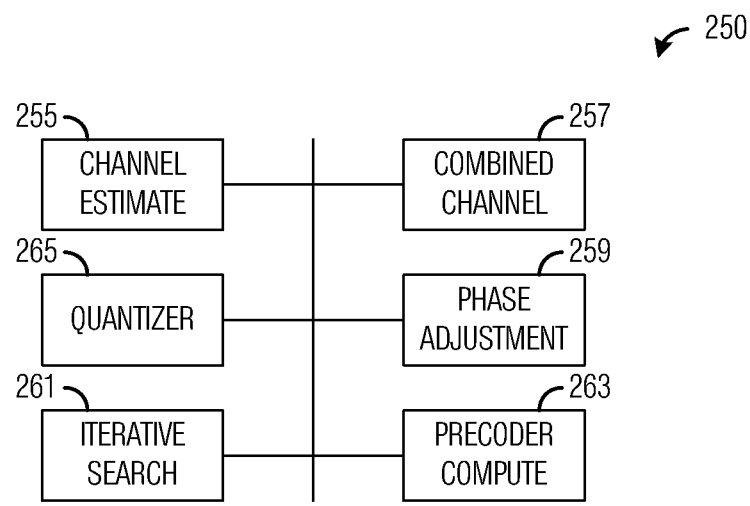

FIG. 2b illustrates a detailed view of a control unit 250. Control unit 250 may be an implementation of control unit 211 of UE 200. Control unit 250 may include a channel estimate unit 255 that may be used to compute an estimate of a channel based on channel measurements. Based on the estimate of the channel, a combined channel unit 257 may combine the channels from eNBs and/or RNs participating in joint transmission. For example, in a situation where two eNBs are participating in joint transmission to a UE, combined channel unit 257 may compute a combined matrix as $$H_1 F_1^{(N_T,L)} + H_2 F_2^{(N_T,L)},$$

where $H_1$ and $H_2$ are measured channel information, and $F_i^{(N_T,L)}$ for $i=0,1$ is a precoding matrix. $F_2^{(N_T,L)}$ may also be a pre-computed value.

Control unit 250 may also include a phase adjustment unit 259 that may be used to compute a phase angle adjustment Q between the channels between the UE and the eNBs participating in joint transmission. A discussion of the computing of the phase angle adjustment Q is provided in detail below.

Control unit 250 may also include an iterative search unit 261. Computing a precoding matrix for n+1 eNBs $F_{n+1}^{(N_T,L)}$ may be a computationally intensive operation. Iterative search unit 261 may help to reduce the computational complexity by iteratively searching for $F_{n+1}^{(N_T,L)}$ after $F_n^{(N_T,L)}$. However, the iterative search for $F_{n+1}^{(N_T,L)}$ may yield a sub-optimal solution Control unit 250 may also include a precoder compute unit 263. Precoder compute unit 263 may be used to find a precoder (F) that optimizes a criterion. Precoder compute unit 263 may be capable of computing a single precoder or jointly computing multiple precoders simultaneously. For example, precoder compute unit 263 may compute precoders (F) such as $$F_1 = \arg\max_{F_1 \in codebook} \|H_1 F_1\|,$$

$$F_2, \ldots, F_K = \arg\max_{F_2, \ldots, F_K \in codebook} \left\| [H_1 \; H_2 \; \ldots \; H_K] \begin{bmatrix} F_1 \\ F_2 \\ \vdots \\ F_K \end{bmatrix} \right\|,$$

or $$F_1, F_2, \ldots, F_K = \arg\max_{F_1, F_2, \ldots, F_K \in codebook} \left\| [H_1 \; H_2 \; \ldots \; H_K] \begin{bmatrix} F_1 \\ F_2 \\ \vdots \\ F_K \end{bmatrix} \right\|,$$

where $H_1$ is the channel matrix of the serving eNB, $H_i$ is the channel estimate for channel i, $i=1, \ldots, K$, and K is a number of eNBs participating in joint transmission. In the above listed examples for computing the precoders (F), a Forbenius norm $\|.\|$ is shown as an exemplary objective function for use with rank-1 transmissions. Other objective functions, such as capacity, minimum distance to the right singular matrix, or so forth, can be used.

As discussed previously, control unit 250 may also quantize the feedback information to help reduce feedback overhead. Control unit 250 may include a quantizer 265 that may quantize the feedback information to reduce the feedback overhead. Preferably, quantizer 265 makes use of codebook quantization to quantize the feedback information. Quantizer 265 may make use of codebooks stored in the UE, such as in memory 213 of UE 200. If codebook quantization is not used or cannot be used, other quantization and/or compression techniques may be used to reduce the feedback overhead.

Figure 3:
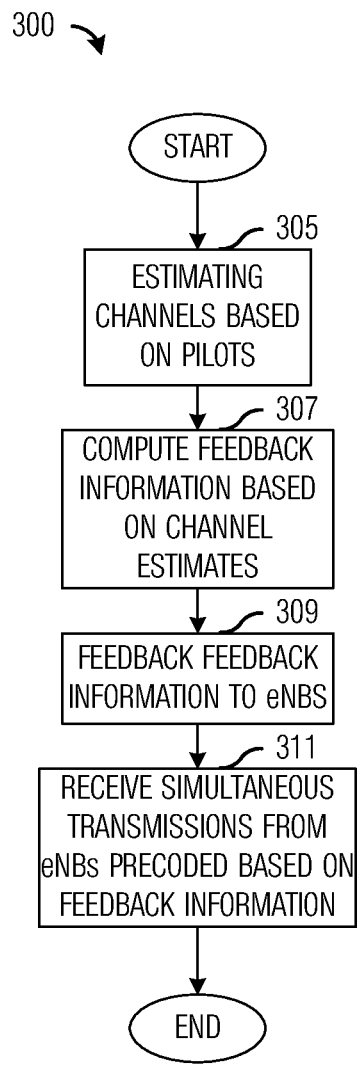
FIG. 3 is a flow diagram of UE operations in receiving joint transmission.

FIG. 3 illustrates a flow diagram of UE operations 300 in receiving joint transmission. UE operations 300 may be indicative of operations occurring in a UE, such as UE 200, as the UE provides channel information feedback to eNBs (and/or RNs) and receives joint transmissions from the eNBs (and/or RNs). UE operations 300 may occur while the UE is in a normal operating mode and may occur periodically or upon an occurrence of an event, such as a message from an eNB or a performance metric (for example, an error rate) exceeding a threshold.

UE operations 300 may begin with the UE estimating channels between itself and the eNBs (and/or RNs) based on pilots transmitted by the eNBs (and/or RNs) (block 305). According to an embodiment, the UEs may estimate the channels based on a general pilot transmitted by the eNBs (and/or RNs). Alternatively, the eNBs (and/or RNs) may transmit a UE specific pilot for each UE served.

From the estimates of the communications channels, the UE may compute feedback information to provide to the eNBs (and/or RNs) for use in joint transmission (block 307). The feedback information may be used by the eNBs (and/or RNs) to obtain a joint precoding matrix for joint transmission. According to an embodiment, the feedback information may be computed in a number of ways to help reduce the amount of information that must be fed back to the eNB (and/or RNs). Details of several embodiments for computing the feedback information are provided below.

An approach that may be used to obtain a joint precoding matrix for joint transmission, e.g., CoMP transmission, may be based on individual PMI reported to each CoMP transmission point (i.e., eNB or RN). However, further coordination among the local PMI may be needed to support coherent CoMP transmission. Coordination of the local PMI may be achieved through phase adjustment, where the UE finds the best phase adjustment values and reports them to the eNBs. In order to reduce feedback overhead, the feedback of the phase adjustment values may also be codebook based, i.e., an index to the phase adjustment codebook is fed back rather than the phase adjustment value itself.

However, the use of the phase adjustment information provided by the UE may require additional feedback (the phase adjustment). Furthermore, the additional feedback depends on the rank and the size of a CoMP cooperation set, i.e., non-uniform feedback overhead. Additionally, the codebook used for phase adjustment feedback cannot always be the already defined precoding codebook, e.g., the 3GPP LTE release-8 codebook.

Figure 4:
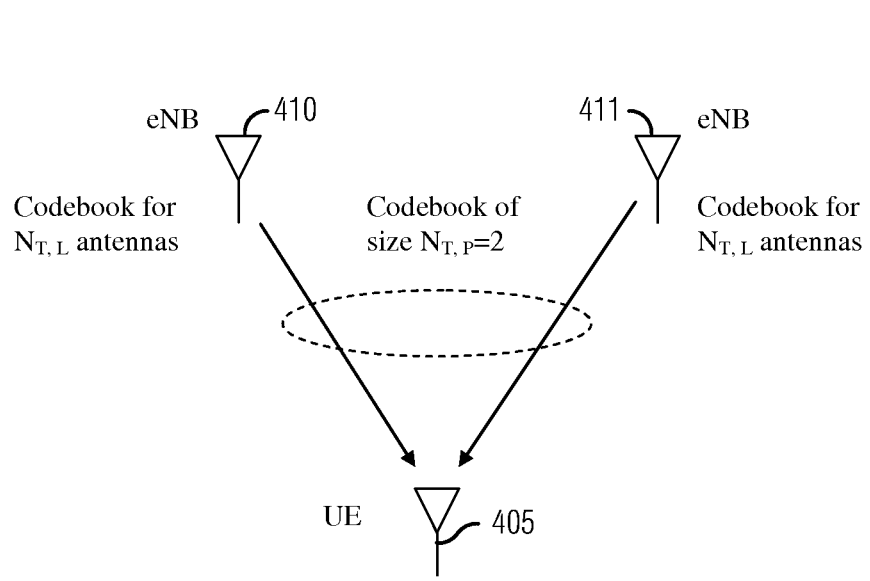
FIG. 4 is a diagram of a portion of a wireless communications system.

FIG. 4 illustrates a portion of a wireless communications system 400. Wireless communications system 400 includes a UE 405 that is being served by two eNBs, eNB 410 and eNB 411. The two eNBs are operating in CoMP transmission and coordinate their transmissions to UE 405. eNB 410 and eNB 411 each use a local codebook for $N_{T,L}$ antennas. For one layer transmission, close to optimum performance may be achieved since the codebook of $N_{T,P}=2^1$ effectively combines the two local codebooks together, making it an effective codebook of $N_T=2N_{T,L}^2$. When $N_{T,L}=4$, the total number of bits needed in the feedback is ten (10) bits, which results in an equivalent codebook of $2^{10}$ (1024) entries. $N_{T,P}$ is the number of equivalent transmit antennas to be considered in phase adjustment. The subscript 'P' stands for 'phase'. $N_{T,L}$ is the number of transmit antennas at one CoMP point. The subscript 'L' stands for 'local'.

The phase adjustment may be expressed for one layer transmission as:

$$G_{PA}=H_1F_1^{(1)}+H_2F_2^{(1)}e$$

$$G_{PA}=H_1F_1^{(1)}+H_2F_2^{(1)}e^{j\frac{k_1\pi}{2}},$$

where H's are isolated matrices, F's are precoding matrices, $k_1=0,\ldots,3$. A straightforward extension of the above may be expressed as:

$$G_{PA}=H_1F_1^{(L)}+H_2F_2^{(L)}E^{(L)},$$

where $E^{(L)}$ is a diagonal matrix of size L, with the i-th element being e $$e^{j\frac{k_i\pi}{2}},$$

$k_i=0,\ldots,3$, and L being the number of layers supported for the UE. The idea is to select $F_1^{(L)}$, $F_2^{(L)}$, and $E^{(L)}$ to maximize the capacity of $G_{PA}$. However, the required feedback bits of $E^{(L)}$ changes with the number of layers supported. This is undesirable since the feedback bits should be independent of L (a codebook design principle of LTE). In addition, phase adjustment is applied to each column of the corresponding matrix; conceptually, it would be more desirable that the adjustment is not column based, but element based—the more random, the better.

It may be possible to view the two local codebooks ($N_{T,L}$) as being joined by a second codebook defined in LTE. When extended to phase adjustment, the phase adjustment may be expressed as:

$$G_{PA}=H_1F_1^{(L)}+H_2F_2^{(L)}Q^{(L)},$$

where $Q^{(L)}$ is a joint matrix. For L=2, $Q^{(L)}$ (the phase adjustment matrix) is actually a 2-by-2 matrix from the LTE $N_T=2$ codebook. This allows the feedback bits to be independent of L and remain constant.

However, a combined matrix $(F_2^{(L)}Q^{(L)})$ is no longer a unitary matrix when $F_2^{(L)}$ is a tall matrix (e.g., when $N_{T,L}=4$). But in LTE-A with a UE specific reference sequence (RS) being used this should not be a significant problem. Furthermore, since $Q^{(L)}$ is an L-by-L matrix, different codebooks may be required for different L. For example, when L=3, then a codebook of size 3-by-3 is needed.

Figure 5A:
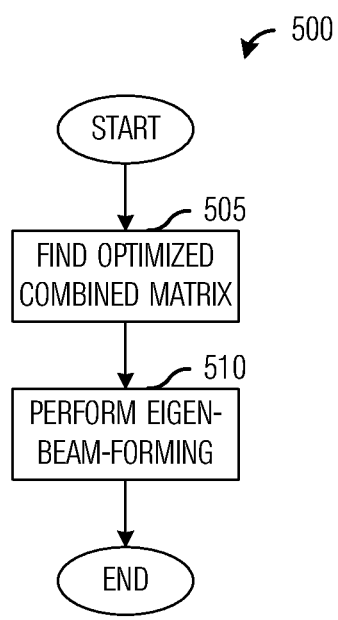
FIG. 5a is a flow diagram of operations in computing feedback information for CoMP transmission.

FIG. 5a illustrates a flow diagram of operations 500 in computing feedback information for CoMP transmission. Operations 500 may be indicative of operations taking place in a UE, such as UE 405, that is participating in CoMP transmissions with multiple eNBs, such as eNBs 410 and 411. Operations 500 may be illustrative of a unified scheme for computing feedback information for CoMP transmission.

The unified scheme defines an equivalent matrix as:

$$G_{unified}=(H_1+H_2F^{(N_{T,L})})Q^{(L)},$$

where $H_1$ and $H_2$ are measured channel information and are isolated matrices, and $(H_1+H_2F_2^{(N_{T,L})})$ is an optimized combined matrix. The measured channel information may be measured by the UEs and may be measurements of pilots and/or reference sequences transmitted by the eNBs, for example.

In the unified scheme, the separate feedback associated with the coordination of the eNBs is eliminated. Therefore, the feedback amount is equivalent to localized codebook feedback with no coordination (two localized codebook indices) and is independent of L and is fixed. Unlike in the localized codebook case (as discussed above), wherein each localized codebook index is selected according to isolated matrices ($H_1$ and $H_2$), the unified scheme first finds the optimized combined matrix $(H_1+H_2F_2^{(N_{T,L})})$ (block 505) and then uses $Q^{(L)}$ to perform eigen-beam-forming (block 510). Eigen-beam-forming is performed on the optimized combined matrix, not on each individual matrix. This may also help to simply the codeword search complexity. Operations 500 may then terminate.

$Q^{(L)}$ is from the codebook that has the same number of transmit antennas as the precoding matrix $F_2$, implying that no additional codebook is needed. Since the precoding matrix $F_2^{(N_T,L)}$ is a unitary matrix, $F_2^{(N_T,L)}Q^{(L)}$ are the columns from a unitary matrix which may not be an entry in the 3GPP LTE Release-8 codebook. Given that a UE specific reference sequence (RS) being used this should not be a significant problem. Inter-transmission point (eNB) coordination may be achieved through optimized matrix combination (within the limit of the defined codebook).

In summary, the unified scheme uses a localized codebook but does not employ localized eigen-beam-forming. It takes two different steps: find the optimum combined effective matrix, and then perform eigen-beam-forming on the resulting-in matrix. This makes the feedback overload constant, and since beam-forming is performed over the optimally (limited by the 3GPP Release-8 codebook) combined matrix, overall performance is assured. Note that no codebook other than the one that has been adopted in 3GPP Release-8 is required; in addition, the phase-adjustment overhead is eliminated.

The unified scheme can be easily extended to more than two CoMP points. For example, with $N_{CoMP}$ CoMP points, the equivalent matrix becomes:

$$G_{unified} = \left(H_1 + \sum_{m=2}^{N_{CoMP}} H_m F_m^{(N_T,L)}\right) Q^{(L)}.$$

The feedback overhead remains the same as localized codebook feedback with no phase adjustment. With phase adjustment, the feedback overhead will increase as $N_{CoMP}$ increases.

As the eNB receives the feedback information, the eNB may make use of the feedback information as it is received. Alternatively, the eNB may modify the feedback information before use or the eNB may elect to ignore the feedback information all together. For example, the eNB may omit one or more points of information from the feedback information.

For discussion purposes, the UE may provide feedback information for a situation wherein $N_{CoMP}$ is greater than two. However, the eNB may override the UE's feedback information and provide support only single-cell transmission. In this situation, the $$G_{unified} = \left(H_1 + \sum_{m=2}^{N_{CoMP}} H_m F_m^{(N_T,L)}\right) Q^{(L)},$$

as provided by the UE may become $G_{unified}=H_1 Q^{(L)}$ when the eNB choses to ignore all H and $F^{(N_T,L)}$ terms greater than one.

Figure 5B:
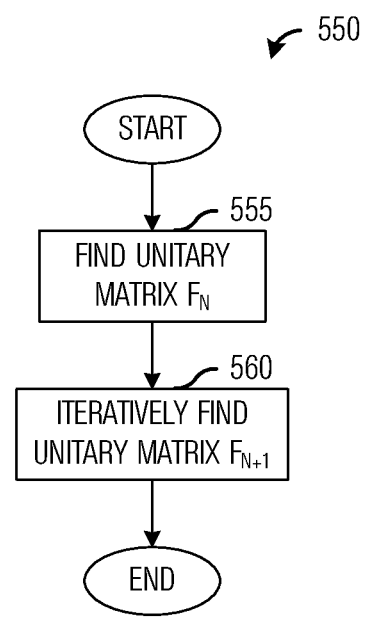
FIG. 5b is a flow diagram of operations in computing feedback information for CoMP transmission, wherein an iterative approach is taken to simplify computing the feedback information.

FIG. 5b illustrates a flow diagram of operations 550 in computing feedback information for CoMP transmission, wherein an iterative approach is taken to simplify computing the feedback information. Operations 550 may be indicative of operations taking place in a UE, such as UE 405, that is participating in CoMP transmissions with multiple eNBs, such as eNBs 410 and 411. Operations 550 may be illustrative of an iterative scheme for finding the precoding matrix F of feedback information for CoMP transmission.

To simplify codebook searching complexity, operations 550 may be adopted to find a sub-optimum solution. For example, after finding $F_n^{(N_T,L)}$ (block 555), $F_{n+1}^{(N_T,L)}$ may be searched iteratively to maximize the capacity of $$G_{unified} = \left(H_1 + \sum_{m=2}^{n} H_m F_m^{(N_T,L)}\right) + H_{n+1} H_{n+1}^{(N_T,L)}$$

(block 560). Operations 550 may then terminate.

The equivalent precoding matrix for each point $F_m^{(N_T,L)}Q^{(L)}$ no longer always has normalized value '1' as the first element. For example, with $N_{T,L}=2$, the following one layer precoding vectors may be created:

$$\begin{bmatrix} 1 \\ 0 \end{bmatrix}, \begin{bmatrix} 0 \\ 1 \end{bmatrix}, \frac{1}{2}\begin{bmatrix} 1+j \\ 1-j \end{bmatrix}, \frac{1}{2}\begin{bmatrix} 1-j \\ 1+j \end{bmatrix}, \frac{1}{2}\begin{bmatrix} 1+j \\ 1+j \end{bmatrix}, \frac{1}{2}\begin{bmatrix} 1-j \\ -1+j \end{bmatrix}, \begin{bmatrix} 0 \\ j \end{bmatrix}.$$

If the newly created precoding vectors are examined, four of them are:

$$\begin{cases} \frac{1}{2}\begin{bmatrix} 1+j \\ 1-j \end{bmatrix} = \frac{e^{j\frac{\pi}{4}}}{\sqrt{2}}\begin{bmatrix} 1 \\ -j \end{bmatrix} \\ \frac{1}{2}\begin{bmatrix} 1-j \\ 1+j \end{bmatrix} = \frac{e^{-j\frac{\pi}{4}}}{\sqrt{2}}\begin{bmatrix} 1 \\ j \end{bmatrix} \\ \frac{1}{2}\begin{bmatrix} 1+j \\ 1+j \end{bmatrix} = \frac{e^{j\frac{\pi}{4}}}{\sqrt{2}}\begin{bmatrix} 1 \\ 1 \end{bmatrix} \\ \frac{1}{2}\begin{bmatrix} 1-j \\ -1+j \end{bmatrix} = \frac{e^{-j\frac{\pi}{4}}}{\sqrt{2}}\begin{bmatrix} 1 \\ -1 \end{bmatrix}, \end{cases}$$

which have already included phase rotation $\pi/4$ and $-\pi/4$ in them. When compared to pure localized codebook feedback, this additional information comes at no extra cost.

In a purely localized codebook feedback scheme, each point (eNB) may have different rank and a UE may have to decide which rank to use for each individual point to form a final combined link configuration. In the case of the unified scheme, since the final step is to form a combined matrix with maximum capacity, it may be possible to leave this decision to the combined matrix and therefore individual rank decision may be avoided.

In coherent joint transmission, a goal may be to have constructive superposition of the signals arriving at the UE from different cooperating eNBs (and/or RNs). A different approach may be utilized to compute feedback information to maximize communications system performance.

The unified scheme for two eNBs (or RNs) discussed above may be re-written as $$G_{unified} = H_1 F_1^{(N_{T1},L)} + H_2 F_2^{(N_{T2},L)},$$

where $H_1$ and $H_2$ are measured channel information for a first eNB and a second eNB, respectively, and $F_1^{(N_{T1},L)}$ and $F_2^{(N_{T2},L)}$ are codewords from codebooks for $H_1$ and $H_2$, respectively, selected by a UE receiving joint transmission from the two eNBs.

Selection of the codewords $F_1^{(N_{T1},L)}$ and $F_2^{(N_{T2},L)}$ by the UE may be performed in several different ways, with each providing distinct advantages.

Generally, in a communications system wherein K eNBs (or RNs or a combination thereof) are transmitting to a UE using joint transmission, the UE may need to report K feedback information, for example, PMI, back to the eNBs, where K is an integer value greater than or equal to two. The feedback information may be selected jointly to optimize joint transmission. An advantage may be that no additional feedback overhead or change to a format of the feedback information (e.g., the PMI) is needed for coherent joint transmission. As an example, the feedback mechanism specified in 3GPP LTE release-8 may be used with a feedback overhead proportional to K.

The effective channel may be expressed as $$H_{eff} = H_1 F_1 + H_2 F_2 + \ldots + H_K F_K = [\, H_1 \quad H_2 \quad \ldots \quad H_K \,] \begin{bmatrix} F_1 \\ F_2 \\ \vdots \\ F_K \end{bmatrix}.$$

A goal of selecting the feedback information may be to maximize the effective channel capacity. For example, if the transmission is a rank-1 transmission, $H_{eff}$ is a vector and maximizing the effective channel capacity may be equal to maximizing a norm of $H_{eff}$.

FIG. 6a illustrates a flow diagram of first operations 600 for use in computing feedback information for use in joint transmission. First operations 600 may be indicative of operations occurring in a UE participating in joint transmission with multiple eNBs. First operations 600 may be illustrative of the computing of feedback information to optimize the constructive superposition of signals arriving at the UE.

First operations 600 may begin with the UE computing the feedback information for a serving eNB (block 605). The serving eNB may be one of the eNBs participating in the joint transmission and may be the eNB responsible for coordinating the joint transmission. The UE may compute the feedback information (a codeword $F_1$) from a per eNB codebook that maximizes $\|H_1 F_1\|$, where $H_1$ is the channel matrix of the serving eNB. In other words, codeword $F_1$ may be found so that $$F_1 = \arg\max_{F_1 \in codebook} \|H_1 F_1\|$$

is satisfied.

The UE may then compute the feedback information for cooperating eNBs, i.e., the remaining eNBs participating in the joint transmission (block 610). A criterion for computing the feedback information for the cooperating eNBs may differ for different network operation considerations. According to an embodiment, the UE may compute the feedback information that satisfies the following criterion $$F_2, \ldots, F_K = \arg\max_{F_2, \ldots, F_K \in codebook} \left\| [\, H_1 \quad H_2 \quad \ldots \quad H_K \,] \begin{bmatrix} F_1 \\ F_2 \\ \vdots \\ F_K \end{bmatrix} \right\|.$$

Utilizing the criterion listed above, inter-eNB cooperation for both CoMP joint processing and coordinated beamforming/coordinated switching may be achieved through codeword selection. The feedback information for the serving eNB ($F_1$) is computed in block 605 and the feedback information for the cooperating eNBs ($F_i$ with $i=2, \ldots, K$) are maximized based on the criterion in block 610. By separately computing the feedback information for the serving eNB, the feedback information for the serving eNB may be optimized in a situation where there is a fall back to single eNB transmission.

FIG. 6b illustrates a flow diagram of second operations 650 for use in computing feedback information for use in joint transmission. Second operations 650 may be indicative of operations occurring in a UE participating in joint transmission with multiple eNBs. Second operations 650 may be illustrative of the selection of feedback information to optimize the constructive superposition of signals arriving at the UE.

In second operations 650, instead of separately computing the feedback information for the serving eNB and the cooperating eNBs, the feedback information for the serving eNB and the cooperating eNBs may be computed jointly (block 655). According to an embodiment, the feedback information for the serving eNB and the cooperating eNBs may be computed by satisfying the following criterion $$F_1, F_2, \ldots, F_K = \arg\max_{F_1, F_2, \ldots, F_K \in codebook} \left\| [\, H_1 \quad H_2 \quad \ldots \quad H_K \,] \begin{bmatrix} F_1 \\ F_2 \\ \vdots \\ F_K \end{bmatrix} \right\|.$$

Since the feedback information for all eNBs are computed jointly, the feedback information for the serving eNB may no longer be optimized, therefore, fall back performance may suffer. However, second operations 650 may be suitable for fast eNB selection since optimization is weighted towards the stronger eNBs. In the criterion shown above, other objective functions and maximization processes, such as K-step iteration, may be used.

An advantage of both first operations 600 and second operations 650 may be that eNBs with different number of transmit antennas may be supported.

In general, the techniques for computing feedback information discussed above in FIGS. 5a, 5b, 6a, and 6b may be different variations of a single technique. For example, the re-written unified scheme ($G_{unified}=H_1 P_1 + H_2 P_2$), if $P_1$ is set to be equal to $Q^{(L)}$ and $P_2$ is set to be equal to $F_2^{(N_{T,L})} Q^{(L)}$, then the techniques may be equivalent.

Referring back to FIG. 3, after computing the feedback information, the UE may provide the feedback information to the eNBs (block 309). According to an embodiment, the feedback information may be provided to the eNBs over a feedback channel in encoded form or unencoded form. According to an embodiment, the feedback information may be provided to the serving eNB, which may then be responsible for transmitting the feedback information to the cooperating eNBs. According to another embodiment, the feedback information may be provided to all eNBs participating in the joint transmission with the UE. According to yet another embodiment, the feedback information may be provided to all eNBs in a broadcast message.

After providing the feedback information to the eNBs, the UE may receive simultaneous transmissions from the eNBs, wherein the simultaneous transmissions may be precoded based on the feedback information (block 311). UE operations 300 may then terminate.

Figure 7:
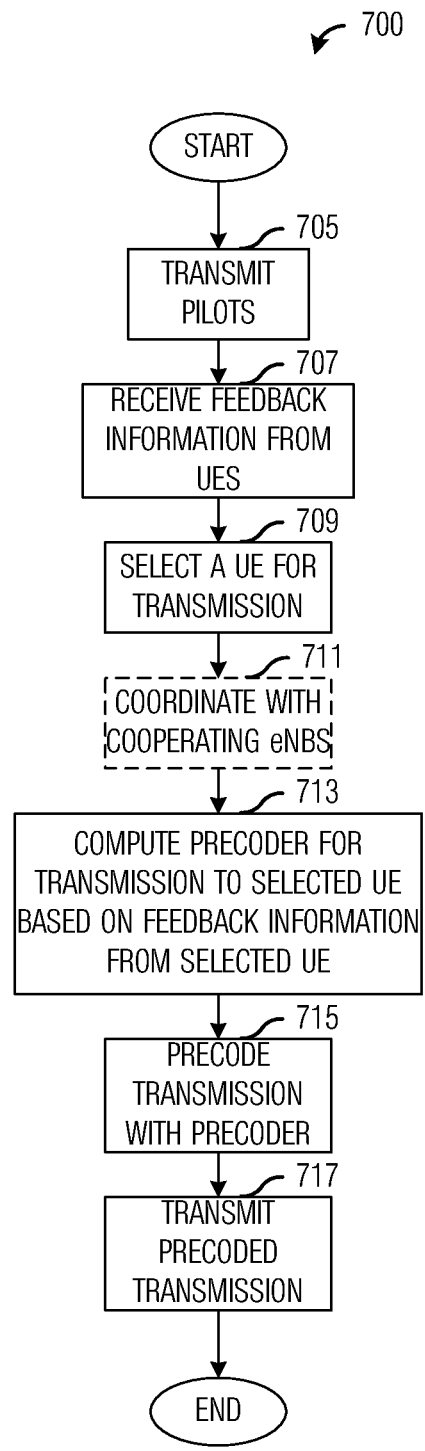
FIG. 7 is a flow diagram of eNB operations in participating in joint transmission.

FIG. 7 illustrates a flow diagram of eNB operations 700 in participating in joint transmission. eNB operations 700 may be indicative of operations occurring in an eNB that is operating as a serving eNB, which may be responsible for coordinating a joint transmission to a UE. eNB operations 700 may occur while the serving eNB is operating in a normal operating mode.

eNB operations 700 may begin with the serving eNB transmitting a pilot (block 705). According to an embodiment, the serving eNB may transmit a UE specific pilot or a generic pilot for all UEs. According to another embodiment, the serving eNB may transmit a reference sequence other than a pilot. In addition to the serving eNB transmitting the pilot, other eNBs (and/or RNs) participating in joint transmission may transmit pilots. The pilots or reference sequences transmitted by the eNBs may allow the UEs to measure communications channels between themselves and the eNBs.

The serving eNB may then receive feedback information from the UEs (blocks 707). According to an embodiment, the feedback information received from the UEs may include channel information related to a channel between the serving eNB and each of the UEs.

According to an embodiment, the UEs may transmit the feedback information only to the serving eNB. The serving eNB may then be responsible for coordinating with the cooperating eNBs to distribute the feedback information. According to another embodiment, the UEs may transmit the feedback information to all eNBs participating in joint transmission. For example, a single message comprising the feedback information may be transmitted to all eNBs and the eNBs may be responsible for retrieving an appropriate feedback information corresponding to its channel with the UE. According to another embodiment, the UEs may broadcast the feedback information to all eNBs that can detect transmissions from the UEs.

The serving eNB may select a UE for transmission (block 709). The serving eNB may select a UE for transmission based on a variety of factors, including but not limited to a presence of data buffered at the serving eNB for the UE, an amount of data buffered, a priority of the data in the buffer, a priority of the UE, a serving history of the UE, available communications system bandwidth, service priorities and restrictions, and so forth.

If the UEs provided feedback information only to the serving eNB, the serving eNB may coordinate with cooperating eNBs to share with them the feedback information provided by the UEs (block 711). According to an embodiment, the serving eNB may periodically coordinate with the cooperating eNBs to share feedback information. As an example, the serving eNB may coordinate with the cooperating eNBs each time the serving eNB receives feedback information.

After selecting the UE for transmission, the serving eNB may compute a precoder for the transmission to the selected UE (block 713). According to an embodiment, the computing of the precoder may be based on the feedback information provided by the selected UE. The serving eNB may then precode the transmission with the computed precoder (block 715) and then at a network resource corresponding to a transmission opportunity scheduled for the selected UE, the serving eNB (along with the cooperating eNBs) may transmit the precoded transmission to the selected UE (block 717). eNB operations 700 may then terminate.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a communications device receiving a joint transmission from a plurality of communications controllers, the method comprising:
    performing channel estimation on a plurality of channels extending between the communications device and each of the plurality of communications controllers, thereby producing a plurality of channel estimates;
    combining the plurality of channels into a combined channel;
    computing a phase adjustment for the combined channel;
    computing feedback information using the plurality of channel estimates in accordance with the phase adjustment;
    quantizing the phase adjustment;
    transmitting the quantized phase adjustment and the feedback information to one or more of the plurality of communications controllers; and
    receiving simultaneous transmissions from the plurality of communications controllers, wherein the simultaneous transmissions are precoded in accordance with the feedback information,
    wherein the plurality of communications controllers comprises two communications controllers, and wherein computing the feedback information comprises computing a precoder for the combined channel that maximizes an effective channel $H_{eff}$, where the effective channel is expressible as: $H_{eff}=(H_1+H_2Q)F=H_1F+H_2QF$, where $H_1$ and $H_2$ are channels between the communications device and the two communications controllers, Q is a phase angle adjustment between channels $H_1$ and $H_2$, and F is the precoder.

2. The method of claim 1, wherein transmitting the feedback information comprises transmitting the feedback information to a serving communications controller responsible for coordinating the joint transmission.

3. The method of claim 1, wherein transmitting the feedback information comprises transmitting the feedback information to each communications controller in the plurality of communications controllers.

4. The method of claim 1, wherein quantizing the phase adjustment comprises selecting an index from a phase adjustment codebook, and wherein transmitting the quantized phase adjustment comprises sending the selected index to one or more the plurality of communications controllers.

5. A method for operating a communications device receiving a joint transmission from a plurality of communications controllers, the method comprising:
    estimating a channel between the communications device and each communications controller in the plurality of communications controllers, thereby producing a plurality of channel estimates;
    computing feedback information in accordance with the plurality of channel estimates, wherein the feedback information is computed in accordance with a joint optimization of the plurality of channels;
    transmitting the feedback information; and
    receiving simultaneous transmissions from the plurality of communications controllers, wherein the simultaneous transmissions are precoded in accordance with the feedback information,
    wherein computing the feedback information comprises:

computing a precoder for a serving communications controller, wherein the serving communications controller is a communications controller responsible for coordinating the joint transmission, and wherein computing the precoder for the serving communications controller comprises computing a codeword from a codebook that attempts to maximize $$F_1 = \arg\max_{F_1 \in codebook} \|H_1 F_1\|,$$

where $H_1$ is a channel matrix of a channel between the communications device and the serving communications controller, and $F_1$ is the precoder for the serving communications controller; and computing precoders for remaining communications controllers in the plurality of communications controllers.

6. A method for operating a communications device receiving a joint transmission from a plurality of communications controllers, the method comprising:

estimating a channel between the communications device and each communications controller in the plurality of communications controllers, thereby producing a plurality of channel estimates;

computing feedback information in accordance with the plurality of channel estimates, wherein the feedback information is computed in accordance with a joint optimization of the plurality of channels;

transmitting the feedback information; and receiving simultaneous transmissions from the plurality of communications controllers, wherein the simultaneous transmissions are precoded in accordance with the feedback information, and wherein computing the feedback information comprises:

computing a precoder for a serving communications controller, wherein the serving communications controller is a communications controller responsible for coordinating the joint transmission; and computing precoders for remaining communications controllers in the plurality of communications controllers, wherein computing precoders for remaining communications controllers comprises computing the precoders that satisfy $$F_2, \ldots, F_K = \arg\max_{F_2,\ldots,F_K \in codebook} \left\| [H_1 \quad H_2 \quad \ldots \quad H_K] \begin{bmatrix} F_1 \\ F_2 \\ \vdots \\ F_K \end{bmatrix} \right\|,$$

where $H_i$ is a channel matrix of a channel between the communications device and an i-th communications controller, $i=1,\ldots K$, K is a number of communications controllers in the plurality of communications controllers, $H_i$ is a precoder for a channel between the communications device, codebook is a codebook used for codebook quantization, and an i-th communications controller, and i=1 indicates the serving communications controller.

7. A method for operating a communications device receiving a joint transmission from a plurality of communications controllers, the method comprising:

estimating a channel between the communications device and each communications controller in the plurality of communications controllers, thereby producing a plurality of channel estimates;

computing feedback information in accordance with the plurality of channel estimates, wherein the feedback information is computed in accordance with a joint optimization of the plurality of channels;

transmitting the feedback information; and receiving simultaneous transmissions from the plurality of communications controllers, wherein the simultaneous transmissions are precoded in accordance with the feedback information, wherein computing the feedback information comprises jointly computing precoders for the plurality of communications controllers, and wherein jointly computing precoders for the plurality of communications controllers comprises computing the precoders that satisfy $$F_1, F_2, \ldots, F_K = \arg\max_{F_1,F_2,\ldots,F_K \in codebook} \left\| [H_1 \quad H_2 \quad \ldots \quad H_K] \begin{bmatrix} F_1 \\ F_2 \\ \vdots \\ F_K \end{bmatrix} \right\|,$$

where $H_i$ is a channel matrix of a channel between the communications device and an i-th communications controller, $i=1,\ldots,K$, K is a number of communications controllers in the plurality of communications controllers, $F_i$, is a precoder for a channel between the communications device, codebook is a codebook used for codebook quantization, and an i-th communications controller, and i=1 indicates a serving communications controller.

* * * * *

UNITED STATES PATENT AND TRADEMARK OFFICE
CERTIFICATE OF CORRECTION

PATENT NO.         : 8,699,589 B2              Page 1 of 1
APPLICATION NO.    : 12/830405
DATED              : April 15, 2014
INVENTOR(S)        : Ming Jia et al.

It is certified that error appears in the above-identified patent and that said Letters Patent is hereby corrected as shown below:

In the Claims

In Col. 16, line 3, claim 6, insert a -- , -- after "i=1, ...".
In Col. 16, line 4, claim 6, delete "$H_i$" and insert -- $F_i$ --.

Signed and Sealed this
First Day of July, 2014

Michelle K. Lee
*Deputy Director of the United States Patent and Trademark Office*